(12) United States Patent
Skillcorn

(10) Patent No.: US 8,402,071 B2
(45) Date of Patent: Mar. 19, 2013

(54) CATALOG THAT STORES FILE SYSTEM METADATA IN AN OPTIMIZED MANNER

(75) Inventor: Stephen Robert Skillcorn, Friday Harbor, WA (US)

(73) Assignee: APTARE, Inc., Campbell, CA (US)

(*) Notice: Subject to any disclaimer, the term of this patent is extended or adjusted under 35 U.S.C. 154(b) by 316 days.

(21) Appl. No.: 12/814,310

(22) Filed: Jun. 11, 2010

(65) Prior Publication Data
US 2010/0325181 A1 Dec. 23, 2010

Related U.S. Application Data

(60) Provisional application No. 61/218,788, filed on Jun. 19, 2009.

(51) Int. Cl.
*G06F 17/30* (2006.01)

(52) U.S. Cl. ........ 707/822; 707/609; 707/637; 707/660; 707/957; 707/821; 707/825

(58) Field of Classification Search .................. 707/600, 707/602, 607, 705, 700, 609, 637, 660, 957, 707/821–822, 825
See application file for complete search history.

(56) References Cited

U.S. PATENT DOCUMENTS

| | | | |
|---|---|---|---|
| 5,652,865 A | 7/1997 | Rawlings, III | |
| 5,721,911 A * | 2/1998 | Ha et al. ................................ | 1/1 |
| 6,324,563 B1 * | 11/2001 | Hotea et al. .................... | 718/104 |
| 6,480,864 B1 | 11/2002 | Fong et al. | |
| 6,892,207 B2 | 5/2005 | McKay et al. | |
| 7,334,002 B2 * | 2/2008 | Byrne .................................... | 1/1 |
| 7,555,624 B2 * | 6/2009 | Hamada ......................... | 711/165 |
| 7,558,927 B2 | 7/2009 | Clark et al. | |
| 7,693,864 B1 * | 4/2010 | Pasupathy et al. ..... | 707/999.102 |
| 7,743,373 B2 * | 6/2010 | Avram et al. .................. | 717/174 |
| 8,122,196 B2 * | 2/2012 | Chang ............................ | 711/137 |
| 8,176,018 B1 * | 5/2012 | Bisson et al. .................. | 707/690 |
| 2002/0099907 A1 | 7/2002 | Castelli et al. | |
| 2004/0148301 A1 | 7/2004 | McKay et al. | |
| 2004/0148302 A1 | 7/2004 | McKay et al. | |
| 2005/0193055 A1 * | 9/2005 | Angel et al. ................... | 709/202 |
| 2006/0173956 A1 | 8/2006 | Ulrich et al. | |
| 2006/0225072 A1 | 10/2006 | Lari et al. | |
| 2006/0253849 A1 * | 11/2006 | Avram et al. .................. | 717/172 |
| 2007/0186066 A1 * | 8/2007 | Desai et al. .................... | 711/162 |
| 2008/0228843 A1 | 9/2008 | Dodge et al. | |
| 2008/0281836 A1 * | 11/2008 | Dykstra-Erickson et al. .............................. | 707/100 |
| 2009/0089340 A1 * | 4/2009 | Ohr et al. ....................... | 707/204 |
| 2010/0240351 A1 * | 9/2010 | Kumar et al. .................. | 455/419 |
| 2010/0268735 A1 * | 10/2010 | Planty et al. ................... | 707/770 |

OTHER PUBLICATIONS

International Search Report in correpsonding PCT Application No. PCT/US2010/38876, mailed Nov. 8, 2010.
Written Opinion in correpsonding PCT Application No. PCT/US2010/38876, mailed Nov. 8, 2010.

\* cited by examiner

*Primary Examiner* — Frantz Coby
(74) *Attorney, Agent, or Firm* — Beyer Law Group LLP

(57) ABSTRACT

A system stores file system metadata in a manner that scales to a large number of entries per "capture," where a capture is metadata of all of the files and their associated directories contained in a logical file system at a given time. The file system metadata is stored, in tangible computer readable media, in data structures that are optimized to the unique characteristics of file system metadata and, particularly, how it is desired to access and process file system metadata. Thus, the technical effect is that processing storing and processing of the file system metadata is highly optimized, such that time, storage and processing power to process the file system metadata is drastically reduced.

22 Claims, 15 Drawing Sheets

```
//Collect from the source, may be file system or something else
while (more entries in source) { [1902]
    add entry to temp store T
}
//Sort the temp store, will give a depth first order
sort (temp store T) [1904]
//Read the depth first temp store and write the files
while (more entries in temp store T) { [1906]
    if (entry is file) { [1908]
        write file to catalog
        add file name to temp store FN
    }
    else { [1910]
        lookup parent directory ENTRY_POINTER in temp store D
        write parent ENTRY_POINTER to catalog
        add current directory + ENTRY_POINTER to temp store D
        add directory name to temp store FN
    }
}
//Write the file names skip list
sort (temp store FN) [1912]
while (more entries in temp store FN) {
    write file name to catalog
}
//Write the directory buckets
sort (temp store D) [1914]
while (more entries in temp store D) {
    write directory to catalog
}
```

```
//Collect from the source, may be file system or something else
while (more entries in source) { [1902]
    add entry to temp store T
}
//Sort the temp store, will give a depth first order
sort (temp store T) [1904]
//Read the depth first temp store and write the files
while (more entries in temp store T) { [1906]
                if (entry is file) { [1908]
                        write file to catalog
                    add file name to temp store FN
                }
                else { [1910]
                        lookup parent directory ENTRY_POINTER in temp store D
                        write parent ENTRY_POINTER to catalog
                        add current directory + ENTRY_POINTER to temp store D
                    add directory name to temp store FN
                }
}
//Write the file names skip list
sort (temp store FN) [1912]
while (more entries in temp store FN) {
                write file name to catalog
}
//Write the directory buckets
sort (temp store D) [1914]
while (more entries in temp store D) {
                write directory to catalog
}
```

FIG. 19

Browse (find the directory info)

```
open the first file page [2002]
//We are at the start of the structure above (fig 11)
read the DIRECTORY_BACK_POINTER [2004] //0 as this is the root
read the parent ENTRY_POINTER [2006] //0-0 as this is the root
//Keep looping through the files until we read a potential
attributes
//byte that has its most significant bit high. This indicates
that the byte
//is a DIRECTORY_BACK_POINTER (fig 9), and not an ATTRIBUTES
(fig 7)
while (next byte not DIRECTORY_BACK_POINTER) [2008]
        read the file //read name, ext, size, create etc
//We now know the files
open the first directory page [2010] //fig 17 and above
read the ENTRY_POINTER [2012] //0-0 as this is the root
read the child count [2014]
for (child count) [2018]
        read the child record
//We now know the child directories
```

FIG. 20

Browse (display file info)

```
open the file page identified by the page of the ENTRY_POINTER
[2102]
jump to the offset identified by the offset of the ENTRY_POINTER
[2104]
read the DIRECTORY_BACK_POINTER [2106]
read the parent ENTRY_POINTER [2108]
//Keep looping through the files until we read a potential
attributes
//byte that has its most significant bit high. This indicates
that the byte
//is a DIRECTORY_BACK_POINTER (fig 9), and not an ATTRIBUTES (fig
7)
while (next byte not DIRECTORY_BACK_POINTER) [2110]
        read the file //read name, ext, size, create etc
//We now know the files
binary search the directory buckets index to identify the
directory page[2112]
//Index shown above, fig 16
open the directory page [2114] //fig 17
while (this entry != seeking ENTRY_POINTER) [2116]
        skip forward the directory entry
//We are now at the directory entry for the directory we are
seeking, i.e. the
//ENTRY_POINTER at the start of the record matches the
ENTRY_POINTER we are
//seeking
for (child count) [2118]
        read the child record
//We now know the child directories
```

FIG. 21

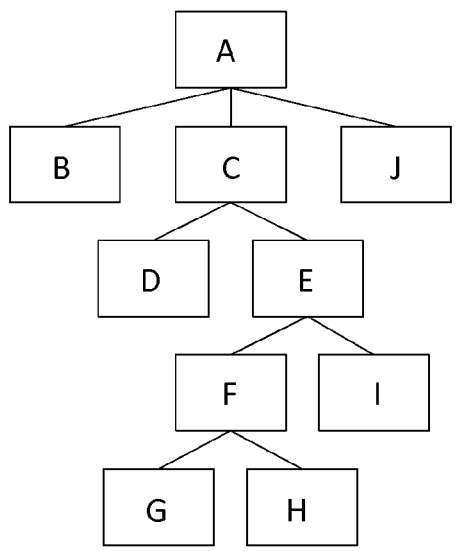

FIG. 22

```
//Given a start ENTRY_POINTER, open the start location
open the file page of the start ENTRY_POINTER [2302]
jump to the offset of the start ENTRY_POINTER [2304]
read the DIRECTORY_BACK_POINTER //and discard [2306]
parent = parent ENTRY_POINTER [2308]
//Find the finish
finish = findNextSibling(parent, start) [2310]
//We're already at the start, so loop through to the
finish
while (current ENTRY_POINTER < finish ENTRY_POINTER)
[2312]
        read file record //increments pointer
        call aggregation function with file
        ....../This is the "db.from" in the calling script
of Fig. 25.
        if (end of page) [2314]
            open next page
```

FIG. 23

```
//Recursively find the next sibling, or parents sibling if none is
present
function findNextSibling(parent ENTRY_POINTER, start ENTRY_POINTER)
{ [2402]
      open the directory bucket for the parent ENTRY_POINTER [2404]
      //Loop through the directory entries until we find the one we
are after
      while (entry is not parent ENTRY_POINTER) [2406]
            read next
      //We are now at the entry for the directory we're interested
in
      for (each child ENTRY_POINTER) [2408]
            if (child > start)
                  //We found the next sibling
                  return child
      //We reached the end of the children, so start must be the
last entry at
      //this level, check we're not the root node and then
recursively call
      //with the parent
      if (parent is the root node) [2410]
            //We reached the end of the root node, so the end is the
last
            //record in the database
            return ENTRY_POINTER.MAX
      //Get the parent's parent
      open the file page of the parent ENTRY_POINTER [2412]
      jump to the offset of the parent ENTRY_POINTER [2414]
      read the DIRECTORY_BACK_POINTER //and discard [2416]
      grandparent = parent ENTRY_POINTER [2418]
      return findNextSibling(grandParent, parent) [2420]
}
```

FIG. 24

```
//Setup the variables that will be returned from the query
def ageBands = [0, 1.monthsAgo, 2.monthsAgo, 3.monthsAgo,
6.monthsAgo, 9.monthsAgo, 12.monthsAgo, 18.monthsAgo,
24.monthsAgo, 30.monthsAgo]
files = new Aggregate()
directories = 0
sizes = new Aggregation([0, 1.kb, 10.kb, 100.kb, 1.mb, 10.mb,
100.mb, 1.gb, 10.gb])
create = new Aggregation(ageBands)
access = new Aggregation(ageBands)
update = new Aggregation(ageBands)
types = new Aggregation([
    office: ["doc", "xls"],
    suspicious: ["mpg", "mp3"]
])
largest = new Largest(1000)
//Iterate over the rows
db.from "/", { row ->
    if (row instanceof Directory) {
        directories++
    }
    else {
        files.add row.size
        sizes.add row.size
        types.add row.extension.toLowerCase(), row.size
        create.add row.create, row.size
        access.add row.access, row.size
        update.add row.update, row.size
        largest.add row.size, row.name + '.' + row.extension
    }
}
```

*FIG. 25*

```
//We know the root page index from the header
leafPageIndex = findLeafPage(query, rootPageIndex)
[2602]
open leaf page  [2604]
read entry  [2606]
while (query > entry.name)  [2608]
    read entry
//If we don't get a match then the value is not
present
while (query matches entry.name) //Ignoring page
breaks [2610]
      open files page entry.pointer.page [2612]
      jump to the offset of entry.pointer [2614]
      //The found file is here
      read and output the file [2616]
      read entry [2618]
```

FIG. 26

```
//Recursively find the next leaf page an entry will lie on if
present
function findLeafPage(query, pageIndex) { [2702]
    open the skip list page pageIndex  [2704]
    //Read through the entries while the query is greater than
the entry
    read entry  [2706]
    while (query > entry.name and not end of page)  [2708]
        read entry
    if (end of page)  [2710]
        return -1 //The entry is not in the skip list
    if (pageIndex is a member of the last level of intermediate
pages) [2712]
        return entry.pageIndex
    //Recurse down into the next level
    return findLeafPage(query, entry.pageIndex) [2714]
```

FIG. 27

CATALOG THAT STORES FILE SYSTEM METADATA IN AN OPTIMIZED MANNER

CROSS-REFERENCE TO RELATED APPLICATIONS

This application claims the benefit of U.S. provisional application 61/218,788, filed on Jun. 19, 2009, the contents of which are hereby incorporated by reference.

TECHNICAL FIELD

The present invention is generally related to techniques to store and use file system metadata. In particular, the present invention is directed to an improved organization of the stored file system metadata.

BACKGROUND

Almost all storage solutions deal with files and file systems. Unless a volume is formatted with some sort of hybrid volume manager, then the underlying operating system (OS) presents a hierarchical structure of files and directories. Systems are known to process file system metadata, such as systems to list files and directories, find the directory to which a file or directory belongs, or to perform aggregation and summaries of directories.

A problem in the prior art is that conventionally it was hard to efficiently compress file system metadata while also supporting other goals, such as searchability and scalability.

Therefore, what is desired is a new system, method, and computer readable medium for storing and processing file system metadata.

SUMMARY OF THE INVENTION

In accordance with an aspect of the invention, a system, method, and computer readable medium is described for storing file system metadata in a manner that scales to a large number of entries per "capture," where a capture is metadata of all of the files and their associated directories contained in a logical file system at a given time.

The file system metadata is stored, in tangible computer readable media, in data structures that are optimized to the unique characteristics of file system metadata and, particularly, how it is desired to access and process file system metadata. Thus, the technical effect is that storing and processing of the file system metadata is highly optimized, such that time, storage and processing power to process the file system metadata is drastically reduced.

For example, the file system metadata may be organized in records such that file system metadata records are stored in a logical sequence that is in a depth first manner, so that an access operation of a full scan of a directory and children of the directory progresses sequentially through the records and pages of records. The catalog of file system metadata being organized in records may include the records being packed into catalog pages, wherein each catalog page includes a plurality of file pages, each file page including metadata regarding a separate file.

The file pages may be organized with respect to directories of the file system such that, for each directory, there is a directory back pointer, a parent entry pointer, and a plurality of file page records for files contained within that directory. The file pages may be compressed, with each file page being self-contained such that the file pages can be decompressed without reference to any other self-contained file page. In this way, the storage space may be minimized while the processing power to decompress the records may also be localized to particular pages, depending on a particular type of query, for example. In some examples, the uncompressed size of each file page is matched to page sizes of a file system on which the catalog is stored.

In some examples, each catalog page further includes a page pointer array, wherein the page pointer array is an array of pointers to the file pages in that catalog page.

Further, an optimized directory elevating jump list and file page elevating jump list may be generated, to optimize certain types of searches and/or queries to the file system metadata catalog.

BRIEF DESCRIPTION OF THE DRAWINGS

FIG. 19 illustrates an example of pseudocode instructions to populate the catalog with the file system metadata.

FIG. 20 illustrates an example of pseudocode to process file system metadata stored in the catalog to display the files and children of a particular file system directory.

FIG. 21 illustrates an example of pseudocode to display the files and children of a child such as determined using the pseudocode of FIG. 20.

FIG. 22 illustrates an example of a tree of entries.

FIG. 23 illustrates an example of pseudocode to navigate from the file page of the start ENTRY POINTER to the file page of the finish ENTRY POINTER, and to meanwhile aggregate particular file system metadata.

FIG. 24 illustrates an example of pseudocode to find the finish ENTRY POINTER.

FIG. 25 illustrates some script Java-like query language script that may be used to generate various aggregations.

FIG. 26 illustrates pseudocode instructions to find the file page entry with the file name metadata that matches the query string.

FIG. 27 illustrates pseudocode instructions for the findLeafPage function called by the FIG. 26 pseudocode.

DETAILED DESCRIPTION

Figure 1:
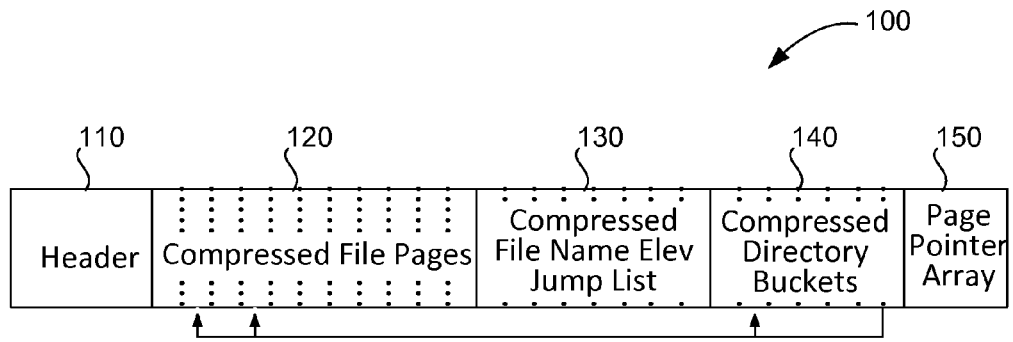
FIG. 1 schematically illustrates an example layout of a catalog having an arrangement of pages in accordance with an embodiment of the present invention.

The present invention generally comprises a system, methods, and a computer program product directed to efficiently storing and accessing file system metadata. In one implementation, a file structure comprises a sequential set of pages organized so that an access operation of a full scan of a directory and children of the directory progresses sequentially through the records and pages of records. The inventor has realized that it is desirable to be able to process the file system metadata in an efficient manner. The file system metadata typically includes information about the files of a file system and/or how the file system is organized (i.e., data about the files and file system) but does not include the "payload data" of the files. The inventor has additionally realized that, due to the potentially large amount of such file system metadata, it is desirable to be able to store the file system metadata that uses space, in a tangible computer-readable medium, efficiently. Typically, the tangible computer-readable medium would be a magnetic disks controlled by a page-based file system, although other tangible computer-readable media and other types of file systems may be employed.

The metadata catalog is used in a system that provides storage onto a computer readable medium and subsequent access to the metadata. In accordance with an aspect, we describe a system that scales to storing file systems metadata in a manner that scales to a huge number of entries per "capture", where a capture is metadata of all of the files and their associated directories contained in a logical file system at a given time. The ultimate source of the metadata may be, for example, the file system itself or, for example, an RDMS or other data collection that is a catalog created by and/or maintained by a backup product.

The file system metadata is stored in data structures that are optimized for the unique characteristics of file system metadata and, particularly, how it is desired to access and process file system metadata. This is contrasted, for example, to a conventional Relational Database Management System which is designed for the CRUD (create, read, update and delete) storage and retrieval of general purpose data and, thus, is not optimized for any particular type of data and how that data is intended to be used, let alone to file system metadata.

In general, the described system may achieve its speed and space levels by optimization during the writing of the file system metadata into a collection of data (referred to herein as a "catalog"). In accordance with some aspects, once created, the catalog structure is intended to be read only.

The file system metadata may be written, for example, so as to optimize the following three basic use case processes for querying the catalog, including the file system metadata, to obtain useful information about the file system to which the file system metadata pertains:

1. List the files and directories in a directory as well as their details.

2. Find the directories a file/directory exists in, including wild cards. For example, this may be enabled in the structure in an "optimized" manner, such that a full table scan is not required.

3. Perform aggregations and summaries of directories.

These three seemingly simple queries can allow the browsing of the captured file system metadata catalog, as well as the ad-hoc querying of the file system metadata to locate files of the file system. In addition summary statistics can be computed through a full or partial scan of the file system metadata catalog.

In assessing the performance and size desires for a file system metadata catalog, the inventor has identified an "affinity" between how file system metadata may be held in a catalog and logical use cases for processing that file system metadata catalog. For example, the inventor has realized that there is a strong correlation between a "record" just read and which record is likely to be read next, and has determined an organization for the file system metadata in the catalog such that the next record to be read is likely to be located very close to the last record read, such as on the same page of data (i.e., on the same page of the file in which the file system metadata catalog is being stored), and ideally in a particular spatial relationship to the last record read, to minimize or avoid having to calculate where the next record is in the catalog.

As a result of how the file system metadata is organized in the catalog—stored on the tangible computer-readable media, a technical effect is to optimize how the file system metadata may be processed, including to optimize the operation of the file system and/or other hardware and software managing the provision of file system metadata from the tangibly-embodied catalog to hardware and/or software that processes the file system metadata.

In some aspects, the following affinities are built in to the structure of the file system metadata catalog of the present invention.

Aggregations

When aggregating a directory and children of the directory, the file system metadata for every file is required to be processed (i.e., examined, at least—irrelevant values may be just read and then discarded). The catalog of file system metadata is organized in the catalog such that the file system metadata records are organized in a depth first order. In this way, a full scan of a directory and the children of the directory progresses sequentially through the records and pages. Only data required for the aggregation is required to be stored in the file metadata records, and the next record always immediately follows the previous. Generally, "depth first order" is given its conventional meaning, namely that the next node attempted to be visited is the node farthest from the root that can be visited, but with the caveat that it must be a child of a node we have already visited.

By organizing the file system metadata catalog as described herein, the start and stop locations in the files pages can be determined by starting at an ENTRY_POINTER of the start directory and finishing at an ENTRY_POINTER of the next sibling of that directory. If the start directory has no immediate sibling, then processing needs to recurse back up to the parent, to find the next nearest node.

Elevating Jump List

An elevating jump list is a modified skip list. Another use case is to query file system metadata that comprises names of files and/or directory. The catalog of file system metadata may include a names elevating jump list that groups ordered names next to each other for sequential traversal. This also has the effect that there is a large amount of similarity between records next to each other. The fact that similar entries lie next to each other enables a binary compression, such that such redundancies are found and eliminated in creating the catalog. The elevating jump list is a modified skip list. As described below in more detail, the elevating jump list is a modified skip list in, for example, it permits the sequential traversal through a b-tree structure.

Directory Names

Another use case is looking up a directory, to browse both the files and the names of the child directories. The catalog of file system metadata may have a data structure of directory names, with all name records for all child directories grouped together under the name record for the parent, so that once the parent is located, the name records for the children are on immediate hand.

As a general aspect, then, the file system metadata may be stored in the catalog with two very distinct layers of compression:

1. Encoding of the primitive data types into bit optimized structures that are well-suited to the storage of file and directory information.
2. Binary compression of the raw data into pages of compressed structures.

The primitive data type encoding utilizes properties of both the absolute and statistically likely bounds of the possible values for the data. Data structures are optimized for the likely bounds, but can expand to accommodate larger, but less likely values.

The records of compressed primitives are arranged onto pages, which are then themselves compressed as binary data using any standard compression library.

In one embodiment, then, a file system metadata catalog is organized into a file that is comprised of a sequential set of pages. These pages are encoded and then compressed, ranging in size from between 6K to 20K. More generally, the pages may be sized such that any page can be retrieved from sequential file system blocks (i.e., the blocks of the file system on which the file system metadata catalog is stored.) Generally, a page size of the catalog need not match the file system page size, as binary compression yields a payload size that is not determinable in advance.

In the following description, while some of the constructs described may be considered by some to be specific to particular languages, the invention in some aspects is considered to apply more generally to the concepts represented by these constructs, whether implemented by those particular languages, other languages, or in some other manner.

In one example, referring to FIG. 1, each portion of a catalog page is one of five types optimized for sequential storage Referring to FIG. 1, one embodiment of the present invention a file system metadata catalog is organized into a file structure that is comprised of a sequential set of pages. In an exemplary embodiment, a header 110 is provided, compressed file pages 120, a compressed file name elevation jump list 130, compressed directory buckets 140, a page pointer array 150. These types are explained in greater detail later in this patent application.

1. Header—4K plus of bootstrap metadata about the file that initializes the engine for reading and querying. For example, the header may provide counts and offsets to the data pages.
2. File—details of files linked to directories.
3. File Name Elevating jump list—an adaption on a balanced skip list of file or directory names.
4. Directory Buckets—balanced buckets of pointers to the files and directories that a given directory contains.
5. Page Pointers—an array of pointers to the offset of the compressed pages in the file.

While the uncompressed size of a file page may be arbitrary, it can be useful to balance the following factors:

1. If the file page size is too small, then the deflation algorithm does not have sufficient data to find redundancy, so compression rates drop.
2. If the page size is too big, then unnecessary inflation work may be performed before the data becomes readable.
3. Smaller pages sizes equal more pages, which equals more page pointers, so the page pointers array grows.

The uncompressed size of a page may also be sympathetic to the size of the disc pages on which the file system metadata catalog is stored, ensuring that as few disk page reads are required as possible to read a catalog page.

Before discussing the portions of a catalog page, as illustrated in FIG. 1, we first discuss some atomic primitives from which each of the catalog's encoded structures are built.

Figure 2:
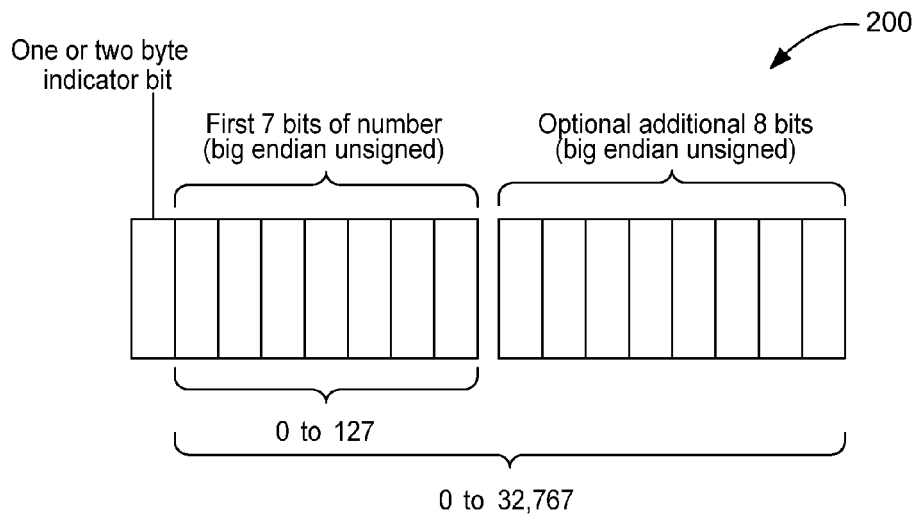
FIG. 2 illustrates an example of a SIZE structure in accordance with an embodiment of the present invention.

A SIZE structure 200 is illustrated in FIG. 2. The SIZE structure is able to represent numbers in the range 0 to 32,767 in one or two bytes. In the illustrated example, the number is big endian encoded with the most significant bit indicating a one or two byte encoding. For example, if the first bit is high, then the structure is one byte long and the remaining seven bits (i.e., other than the first "indicator" bit) represent a number between 0 and 127. If the first bit is low then the remaining 15 bits represent the number.

The SIZE structure 200 illustrated in FIG. 2 is a particularly efficient structure for encoding numbers that are generally less than 128 but which may sometimes be larger. For example, the number of files in a directory is usually under 128, which will result in a one byte encoding, but may be larger, sometimes (but not often) resulting in a two byte encoding.

Figure 3:
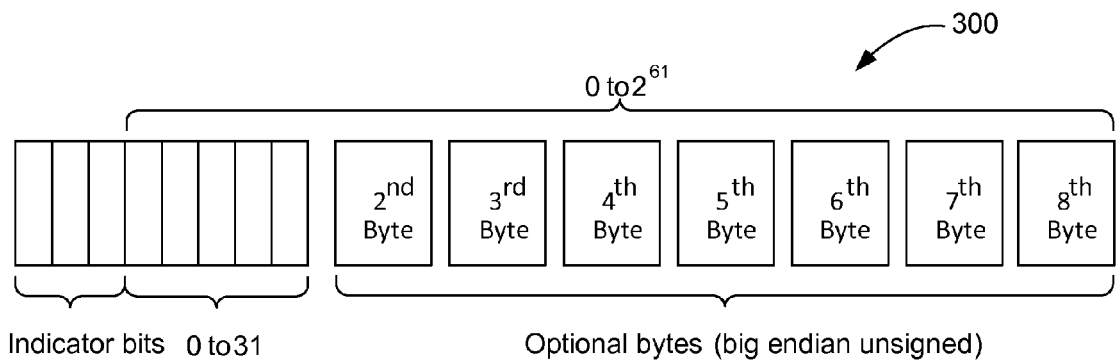
FIG. 3 illustrates an example of a NUMBER structure in accordance with an embodiment of the present invention.

A NUMBER structure 300, as illustrated in FIG. 3, is able to encode much larger numbers, in the range of 0 to 2 to the power of 61. The NUMBER uses a similar strategy to SIZE, but uses the highest three "indicator" bits as the byte counter. In the FIG. 3 example, the number is big endian encoded, with the three significant "indicator" bits indicating the size of the structure in bytes. The number is then encoded into the remaining bits. Numbers 31 or less can be encoded into one byte, which is significant as many file sizes are zero bytes and many size pointers are less than 32 bytes long.

Figure 4:
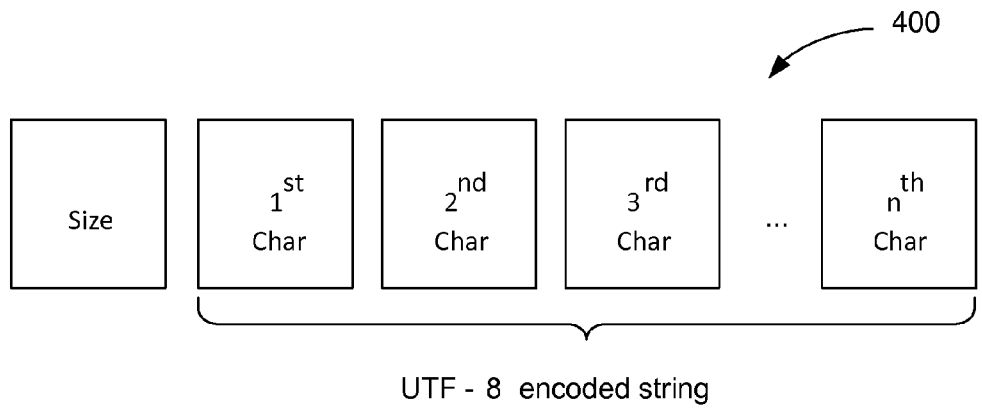
FIG. 4 illustrates an example of a NAME structure in accordance with an embodiment of the present invention.

Names are encoded into the pages using a NAME structure 400, an example of which is illustrated in FIG. 4. The example NAME structure is defined as follows:

The NAME structure includes a SIZE structure, indicating the number of encoded bytes containing the string. In many instances, the string can be encoded into 127 bytes or less and only one byte will be utilized.

Continuing with the FIG. 4 example, the name string itself is UTF-8 encoded into the bytes following the SIZE structure component of the NAME structure. UTF-8 encoding consumes one byte to encode the 127 character standard US-ASCII character set, but allows the full Unicode character set to be encoded. Most file system names match US-ASCII and therefore encode into one byte per character.

Figure 5:
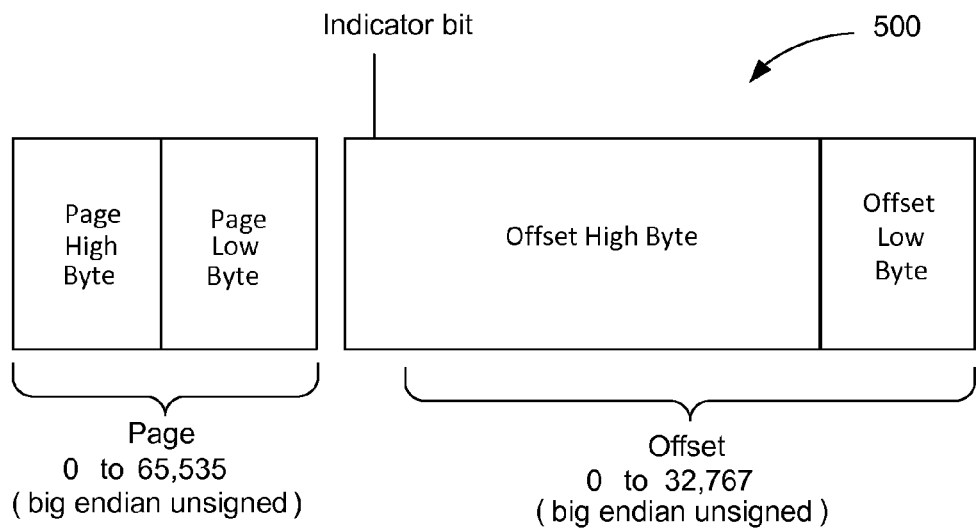
FIG. 5 illustrates an example of an ENTRY_POINTER structure.

An example of the structure of an ENTRY_POINTER 500 is defined as illustrated in FIG. 5. The ENTRY_POINTER structure 500, as illustrated in FIG. 5, is used to point an entry to another entry, such as a FILE_DETAIL structure pointing to its parent DIRECTORY_DETAIL structure.

Pointers can point to entries in pages in the local file, or through the offset indicator bit point to entries in a master catalog, which the present catalog similarities/duplications (Catalog similarities are discussed in greater detail but, basically, a catalog similarity is chained to a master catalog to reduce redundancy between the two. More specifically, when information in the catalog is present in the master catalog, an indicator bit on the parent ENTRY_POINTER is set high and the file data is replaced with a pointer to the actual file data in the master catalog.)

The Page portion of the ENTRY_POINTER structure 500 is the index of the page in the catalog. This number is the index into the Page Pointers array, and identifies on which page the data lies. The low 15 bits of the two offset bytes encode the number of uncompressed bytes from the start of the page where the entry begins.

The most significant bit of the two offset bytes of the ENTRY_POINTER structure 500 represents an indicator bit. This bit is given a different meaning depending on the location of the ENTRY_POINTER. In a Files page, the most significant bit of the ENTRY_POINTER structure 500 indicates if the proceeding data is held locally, or in the Master catalog. In a File Names Elevating jump list page, the most significant bit of the ENTRY_POINTER structure indicates whether the next entry is another pointer for the same name, or a new entry. File Names Elevating jump lists are discussed in detail below but, generally, a File Names Elevating jump list is an adaptation of a classic in memory skip list of file names, for storing a sorted list of file names.

Figure 6:
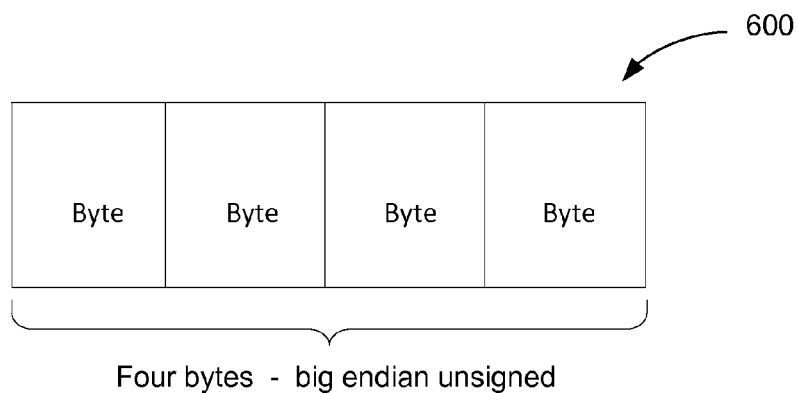
FIG. 6 illustrates an example of a TIMESTAMP structure.

Another primitive structure is the TIMESTAMP structure 600, an example of which is illustrated in FIG. 6. In the FIG. 6 example, the structure may encode a point in time to second precision between the ranges of 1970-01-01 00:00:00 and 2106-02-07 06:28:14; encoded into four bytes. Dates that fall above 2106-02-07 06:28:14 are stored with all the bits high as "future date".

File attributes may be encoded into an ATTRIBUTES structure 700, into one byte, with bits representing each of the individual attributes. An example of this structure is illustrated in FIG. 7.

Figure 7:
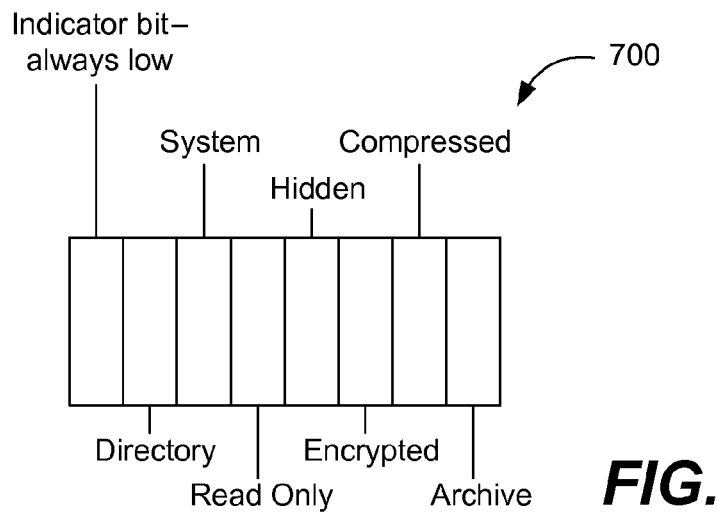
FIG. 7 illustrates an example of an ATTRIBUTES structure.

Referring to FIG. 7, each of the lower 7 bits indicates the presence or absence of an attribute. The most significant bit is used to differentiate an instance of an ATTRIBUTES structure from that of a DIRECTORY_BACK_POINTER. An ATTRIBUTES structure always has the most significant bit low.

Figure 8:
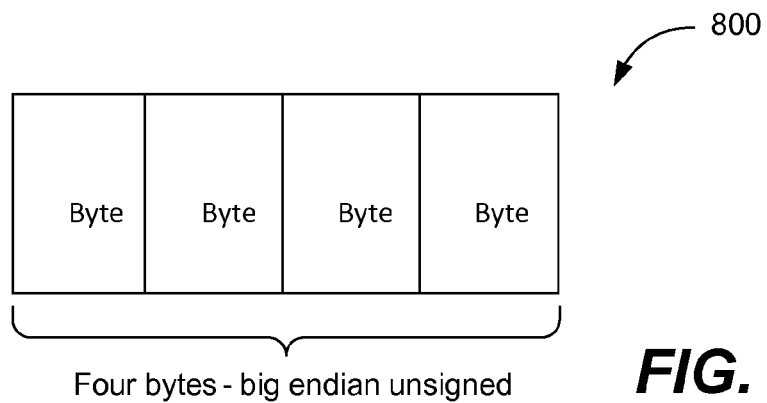
FIG. 8 illustrates an example of a PAGE_POINTER structure.

A PAGE_POINTER structure 800 is utilized to hold a pointer to the offset in the catalog where a page starts. As illustrated in the FIG. 8 example, this structure may be defined as having four bytes, with a big endian unsigned format.

Figure 9:
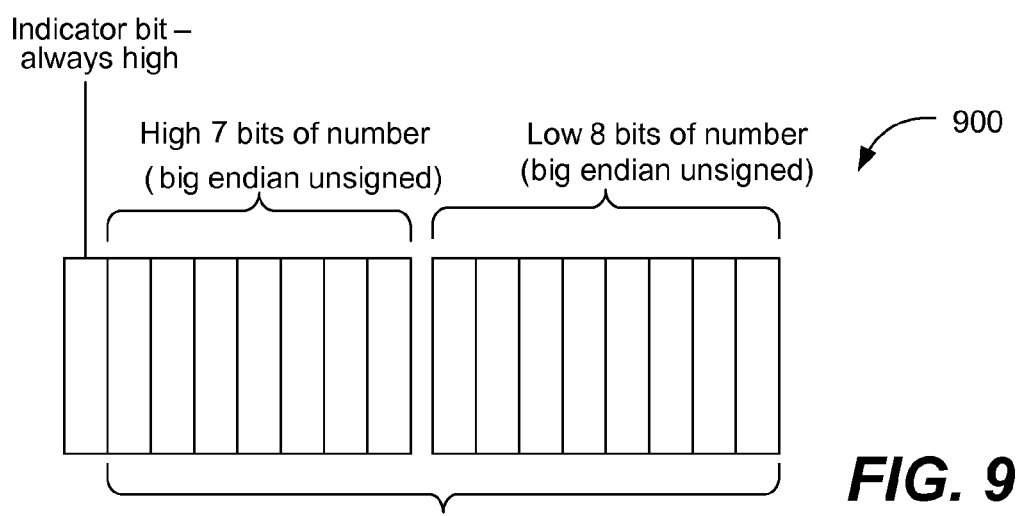
FIG. 9 illustrates an example of a DIRECTORY_BACK_POINTER structure.

As illustrated in FIG. 9, a DIRECTORY_BACK_POINTER structure 900 may be provided to hold a pointer that points from the current directory to the position of the last one. This allows an algorithm to jump into the middle of file system metadata for a set of files and iterate through the file system metadata until hitting the back pointer. Once the pointer is hit, the pointer directs back to the file system metadata for the directory that contains the files. In the FIG. 9 example, a DIRECTORY_BACK_POINTER always encodes to two bytes, with the first bit high.

Thus, for example, the FIG. 9 structure may be used for the use case were a search for a file identifies the file and it is then wished to identify the directory to which the identified file belongs.

Figure 10:
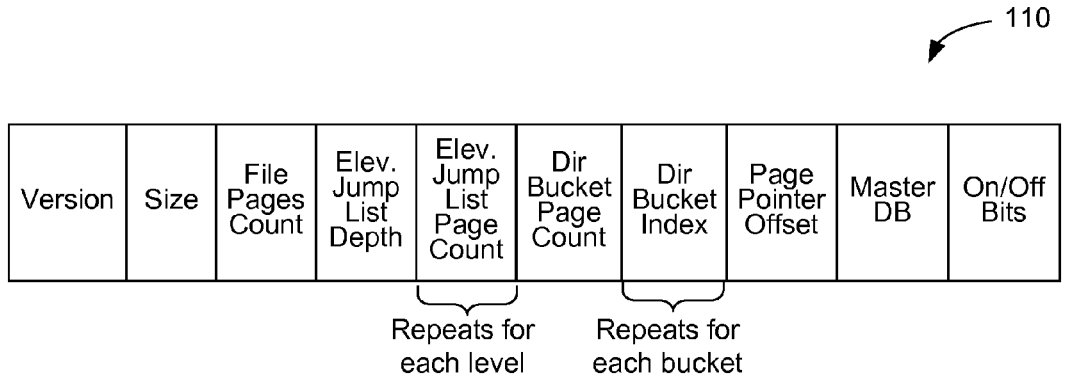
FIG. 10 illustrates an example of a header page.

An example of a header page 110 is illustrated in FIG. 10. In the FIG. 10 example, the first 4K or more of the catalog is the header page, and the header page provides counts and offsets to the other data pages of the catalog.

In some examples, the page will usually by 4K long, but if the repeating elevating jump list depths and directory bucket index entries spill over 4K then the header will be expanded in 4K increments.

In the FIG. 10 example, the values held in the fields of the header 110 are:
1. Version—the version of this file, encoded as a NAME.
2. Size—the size of the header encoded, as a NUMBER.
3. File Pages Count—the number of File pages, encoded as a NUMBER.
4. Elevating jump list Depth—the number of levels the elevating jump list had dropped to, encoded as a NUMBER.
5. Elevating jump list Page Count—the number of pages of each level in the elevating jump list, repeats for each level, encoded as a NUMBER.
6. Directory Bucket Page Count—the number Directory Buckets, encoded as a NUMBER.
7. Directory Bucket Index—the maximum page number that is held in the bucket, repeats for each bucket, encoded as a NUMBER.
8. Page Pointer Offset—the offset from the start of the database file where the Page Pointers start, encoded as a NUMBER.
9. Master DB—the name of the master database, empty if the database is not chained, encoded as a NAME.
10. On/Off Bits—One byte with bits used to indicate the presence of structures to the engine. From least significant bit forward:
   A. Files payload—File entries are carrying a binary payload.
   B. Directories payload—Directory entries are carrying a binary payload.
   C. Searchable—The database has an associated File Names Elevating jump list and is fast searchable.

Figure 11:
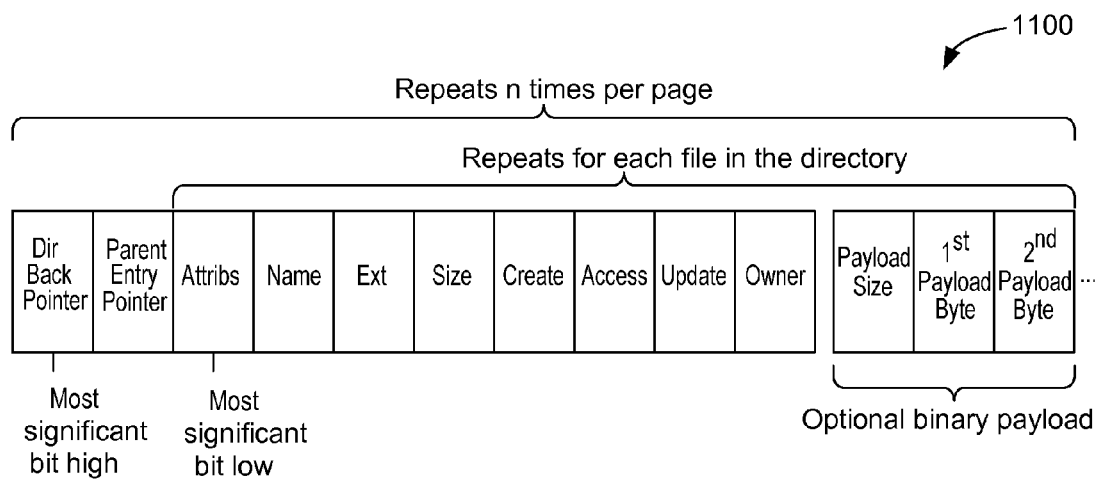
FIG. 11 illustrates an example file page record structure for file pages.

FIG. 11 illustrates an example structure 1100 for the file pages 120. In the FIG. 11 example, the file pages are arranged into records of file and directory details. Details of the directory are held first, followed by a record for each file contained in the directory. Each entry has an intrinsic key that is its ENTRY_POINTER, i.e. each entry starts on a page and at an offset. When a directory points to the file system metadata for its files, it points to this key.

Referring to the FIG. 11 example, details of the file system metadata for the directory are held at the start of the record in two primitives. The first such primitive is the DIRECTORY_BACK_POINTER. Each entry begins with a DIRECTORY_BACK_POINTER that counts back the number of bytes that should be skipped to reach the start of the previous directory entry. The most significant bit of the first byte is always high which is how a DIRECTORY_BACK_POINTER is differentiated from an ATTRIBUTES structure. The DIRECTORY_BACK_POINTER is used as a way to identify which directory a file belongs to if it is found by a search on its name.

The second such primitive is the Parent ENTRY_POINTER. The Parent ENTRY_POINTER is the ENTRY_POINTER of the parent. It is both the location of the parent in the File pages, but also the key to locate the directory in the Directory hash buckets. The Directory hash buckets can then be used to display the siblings of this directory.

After the first two primitive entries for the directory, a repeating set of primitives contain the file system metadata details of each file. These entries are:
1. Its attributes, encoded as an ATTRIBUTES.
2. Its name, encoded as a NAME.
3. Its extension encoded as a NAME.
4. Its size, encoded as a NUMBER.
5. Its create date encoded as a TIMESTAMP.
6. Its access date encoded as a TIMESTAMP.
7. Its update date encoded as a TIMESTAMP.
8. Its owner encoded as a NAME.

The file records can be repetitively read until a high bit is detected for the most significant bit of what would otherwise be the ATTRIBUTES structure. If the bit is high, then the byte is the first byte of a DIRECTORY_BACK_POINTER and the start of the next directory has therefore been reached. It should be noted that the repeating file records may spill over a page boundary, i.e. there may be entries for the same directory on multiple pages.

A file entry may also have an optional binary payload. If the files payload bit is set in the header, then the optional payload structure is expected to follow. This is simply a SIZE followed by that number of bytes. The optional binary payload is arbitrary, and it is up to an application processing the file system metadata catalog to interpret this binary payload data.

It is noted that a file system metadata catalog may be chained to a master catalog, to reduce redundancy between the two. As shown in the FIG. 12 example, an indicator bit on the parent ENTRY_POINTER 1200 may be set high to indicate that what would otherwise be the file data has been replaced with a pointer to the file data in the master catalog. "Deltas" are discussed in greater detail later in this description.

Figure 13:
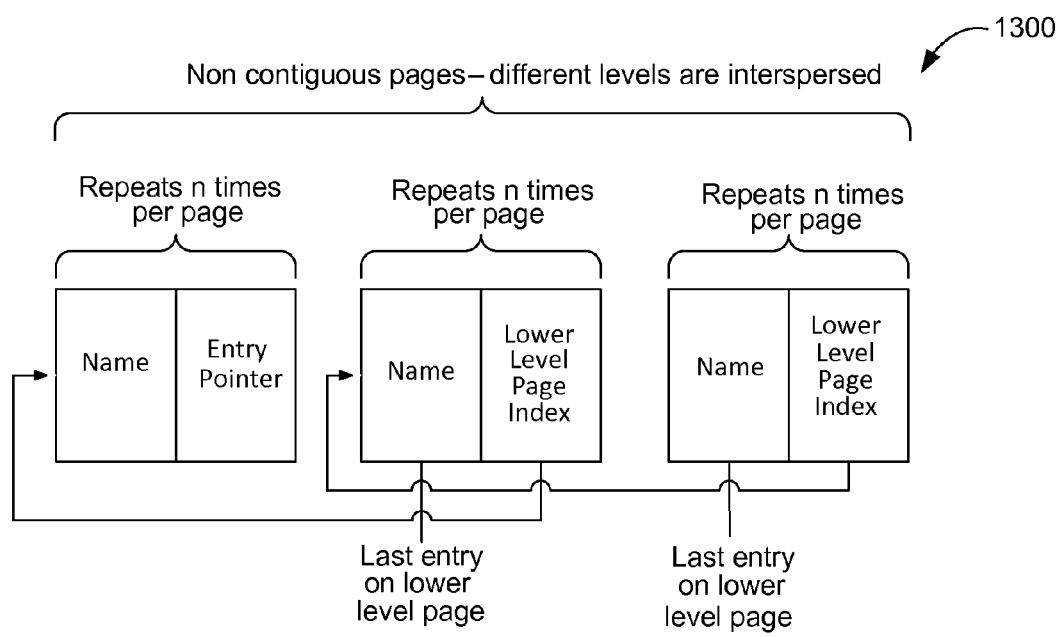
FIG. 13 illustrates an example of a file names elevating jump list.

We now discuss a File Names Elevating jump list Pages structure 1300, with reference to FIG. 13. As mentioned above, the file names elevating jump list is a list of file names that groups ordered names next to each other for sequential traversal. In some examples, this structure allows for rapid location of file system metadata for files and directories where the name matches: 1) the exact file name; 2) the start of the file name matches a wildcard (filename*); or 3) the wildcard appears anywhere in the file name (*filename*).

All file and directory names are sorted into an ordered and amortized elevating jump list like structure. Referring to FIG. 13, the structure may be defined as now described.

The File Names Elevating jump list 1300, according to the FIG. 13 example, is an adaptation of a classic in memory skip list which has been modified to suit the paginated nature of compressed catalog pages and arranged without individual pointers. The elevating jump list is not randomized, but instead uses a balanced build time entries/page constant.

Figure 14:
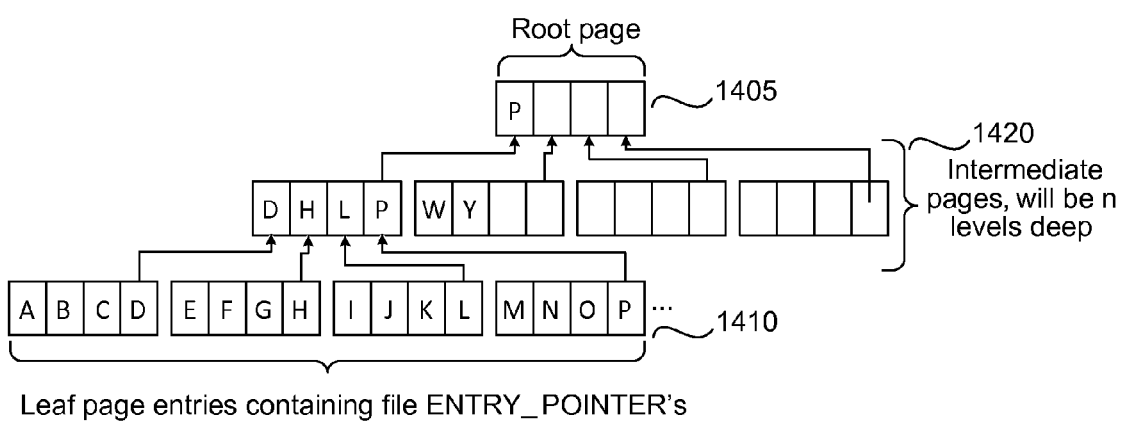
FIG. 14 illustrates an example of a file names elevating jump list viewed as a tree.

For example, as illustrated in FIG. 14, the elevating jump list 1300 may be organized to always have a single root page 1405 with ordered sequential entries 1410 pointing to intermediate pages 1420. Thus, the last entry on each page may be popped up a level until a single root page is able to index all of its child intermediate pages.

The file names elevating jump list 1300 may be processed with a "seek" that depends on the wildcard attributes, if any, for a query. For example, when the query is for an exact or "starts with" match, then the root node may be first queried and sequentially scanned until "query<entry," with additional logic added to handle last entries. Once the entry has been located, then the intermediate page pointed to may be loaded and scanned in the same way until a leaf page is located. Once located, the leaf page may be scanned to obtain the pointer into the Files pages where the metadata for the file resides.

Based on the organization of the catalog, this algorithm means that only one page per level is required to be loaded to perform a full seek. The higher level pages also lend themselves to prioritized caching.

In a case where a wildcard query is made where the expression does not match the Start Characters, the expression cannot be scanned through the elevating jump list. Instead the leaf pages would be full table scanned to look for the match. This is not a scan of the full catalog, though, just the elevating jump list leaves.

Still referring to FIGS. 13 and 14, it is noted that the example Elevating jump list contains both the names of files and directories. In the example, these are differentiated by the most significant bit of the first byte that is pointed to:
1. File—points to the start of the file entry, this is an ATTRIBUTES structure and has its most significant bit low.
2. Directory—points to the start of the whole directory entry in the File pages. This is a DIRECTORY_BACK_POINTER and has its most significant bit high.

In the file elevating jump list, redundancy may be removed. For example, often a name entered in the leaf page of the elevating jump list will be the same as the one preceding it, only the pointer differs. When this occurs, as illustrated in FIG. 15, the entry may hold the name just once and follow the name with the pointers.

Figure 15:
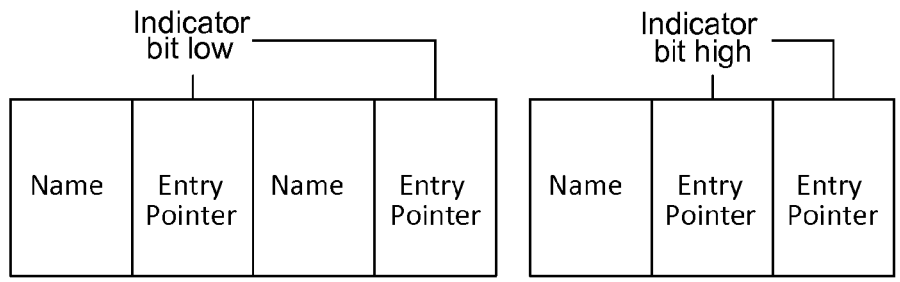
FIG. 15 illustrates an example of linked and unlinked entries.

As illustrated in the FIG. 15 example, then, the indicator bit of the ENTRY_POINTER is used to indicate if the following structure is a:
1. NAME—a new, different entry.
2. ENTRY_POINTER—an additional pointer that is linked to the same name.

Figure 16:
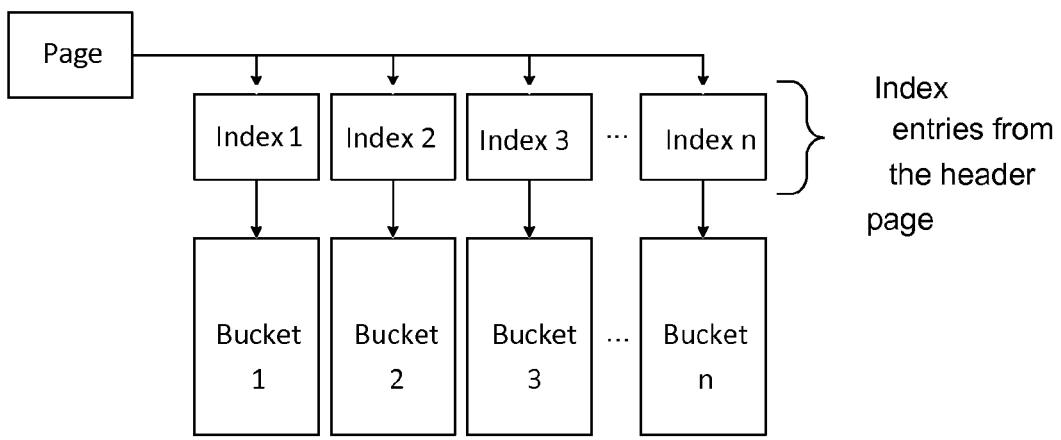
FIG. 16 illustrates an example of directory buckets and an index structure.
Figure 17:
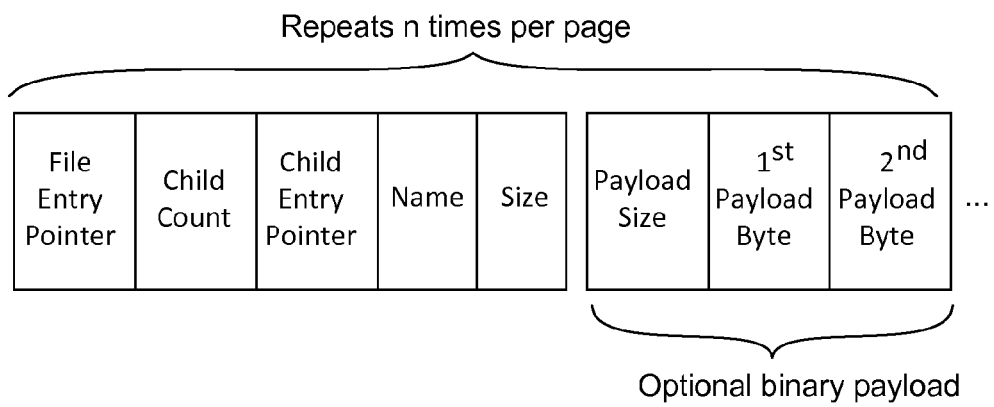
FIG. 17 illustrates an example of an entry in a directory bucket.

We now describe Directory Bucket Pages 140. More particularly, as illustrated in FIGS. 16 and 17, the tree structure of captured file system metadata may be stored in Directory Bucket pages. A Directory is identified by the intrinsic key of where its files lie in the File pages. Each of the File page entries holds the intrinsic key of its parent directory, and that key can be looked up in the Directory Buckets to locate sibling directories.

Each of the directory entries are allocated into a size balanced bucket, and an example of the structure is shown in FIG. 16.

The size of Directory Buckets may be balanced to help ensure that overly large or small buckets are not created. Buckets are filled until they reach an optimal size and a transition in the Files page boundary is detected.

An ordered array of indexes is kept that identifies the first page number in each bucket. To process the directory buckets index, the index may be binary searched to identify the bucket in which the metadata for the directory of interest lies. Once the bucket is identified, the bucket may be sequentially read until the File Entry Pointer is reached (which points to the file page where the files for this directory lie). Once this is found, then the Child Count can be used to identify the number of child directories that are attached to the directory.

As can also be seen from FIG. 17, a directory entry may also have an optional binary payload. If the directory payload bit is set in the header, then the optional payload structure is expected to follow. This is simply a SIZE entry followed by that number of bytes. It is up to the application processing the file system metadata catalog to interpret this binary payload data.

Finally, the catalog also includes a binary array of four byte offsets to where each of the pages of the file system metadata catalog start. The pointers are a constant four bytes so that they can be accessed by index, i.e. page 10 is the four bytes at offset 40.

In use of the catalog, the page pointers may be the first data read from the catalog upon opening the catalog, and immediately cached into memory for easy and efficient access. As mentioned above, for catalogs that represent a repeat of surveying file system metadata across the same file system (generally, at different times that are close enough such that there is a significant amount of repetition between the file system metadata at the two times), one such catalog may act as a chained catalog to another master catalog.

In one example, the differences between two catalogs can take the following forms: 1) additions of files or directories to the structure; 2) renames of files or directories; 3) updated to the details of a file such as its access data; and 4) deletions of files or directories form the structure.

Generally, when a catalog is operating as a delta catalog, it should not have a negative performance impact. An additional concern is potential expansion in size. If the delta is the deletion of a directory the individual deletions should not be recorded as they are potentially large. Another concern is the production of large dependency trees. Deltas should not require that many versions of previous databases be present.

In one example approach, then, when chaining (delta) is activated, a chained database is created against a single master. In one example, due to the complications involved, a catalog that is already chained cannot act as a master to another catalog. This prevents the dependency tree growing too large. One baseline master can act as the master to many chained catalogs. However, in some examples, it may be desirable to allow a catalog that is already chained to also act as a master to another catalog.

A chained catalog will hold the name of its master in the Master DB field of its header. Rather than trying to identify the changes between the two catalogs, the similarities are identified and the Entry Pointers in the chained catalog are modified to point to the data in the master catalog rather than being directly inserted into the chained catalog.

In a typical catalog, much of the catalog size is held in the File pages. The chained catalog may be produced by identifying where the files payload attached to a directory are constant across both catalogs. When this is detected the Files payload is replaced with a pointer to the files in the master database.

Figure 12:
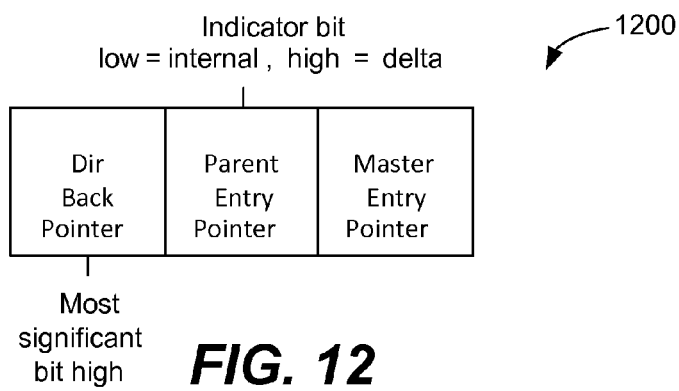
FIG. 12 illustrates an example of a file page record that is a pointer to a master catalog.
Figure 18:
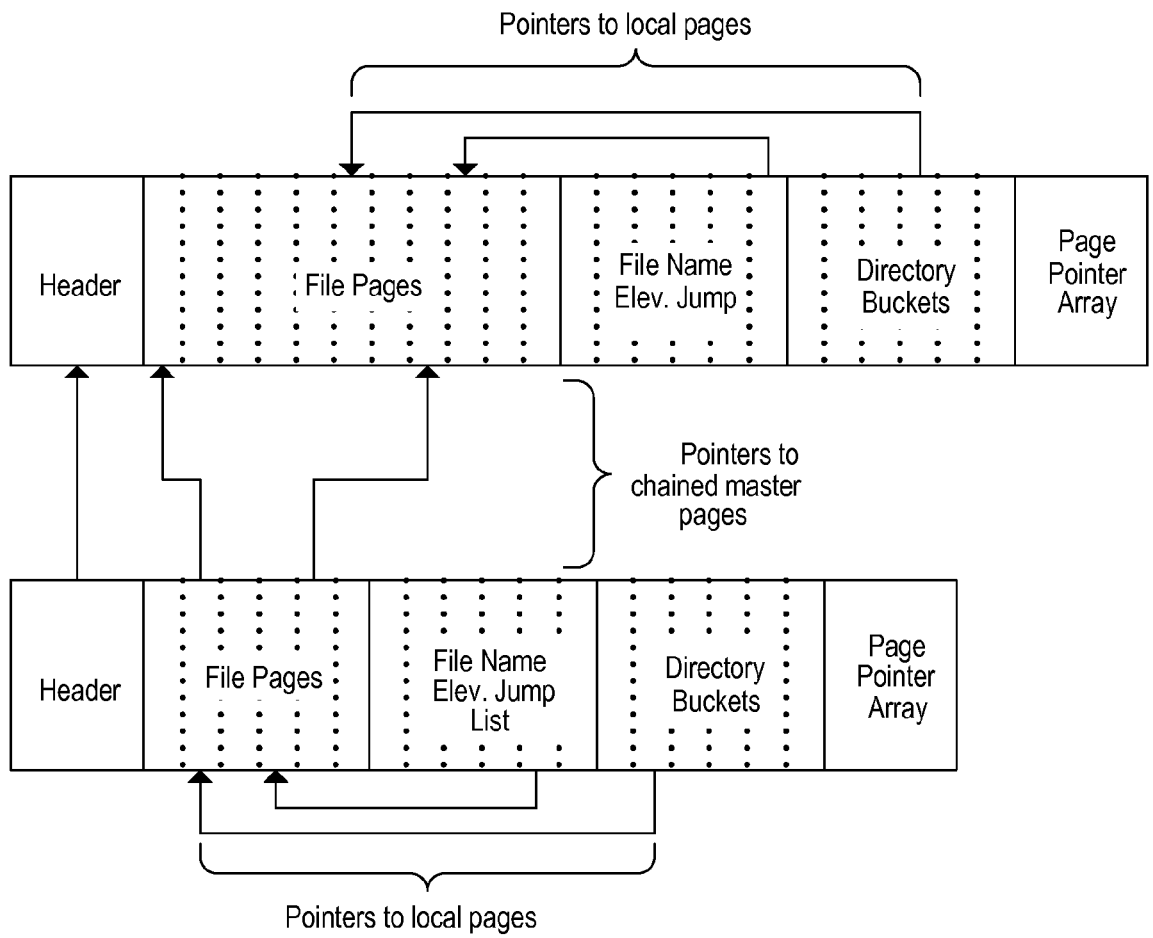
FIG. 18 illustrates an example of a chained catalog with pointers to a master catalog.

FIGS. 12 and 18 illustrate how a chained catalog may be defined.

As can be seen from FIG. 12, discussed previously, the File payload for the chained directory will be completely absent from the chained catalog. When an entry in the Files pages is a chained entry, then the Indicator bit is set high on the Parent Entry Pointer. This can be used by a method of processing the catalog to determine if the payload is chained when reading the file system metadata for the directory. An example of this structure is illustrated in FIG. 12.

An algorithm for seeks and aggregations may vary slightly for a chained catalog. For seeks on file names, the File Names Elevating jump list may be queried as with an unchained catalog but, instead of the pointer pointing to the file, the pointer points to the directory. Upon reading the file, the most significant bit of the first byte is inspected to see if it is high. If the most significant bit is high, then the algorithm knows that a directory has been encountered instead of the ATTRIBUTES structure of a file. It then reads forward to obtain the Master Entry Pointer and follows this to read the files from the master catalog.

With regard to aggregations, when performing aggregations, the Delta bit may be inspected for the Parent Entry Pointer. If this bit is high, then the directory has its files payload marked as chained. The algorithm then reads forward to obtain the Master Entry Pointer and follows this to read the files from the master catalog.

We now discuss the issue of compression. The structure of a file system metadata catalog as discussed above lends itself to page level compression. Uncompressed, a File or Directory page will contain an ordered, repeating list of the primitive structures. Where names repeat in the file system metadata of the data set, these names will also be repeated in the catalog page, albeit with different details such as SIZE and CREATE, UPDATE, ACCESS entries.

One methodology to attempt to reduce this repetition would be to replace a portion of each entry, such as the NAME entry, with a pointer to an external global structure that holds a single entry for each unique NAME. This approach has the following disadvantages. First, a dependency is created on a global file, which would affect all captures if it becomes corrupted. Second, an additional read is required to read the page from this file. Third, a pointer of at lease 5 bytes is still required.

In some examples, each page is compressed, such as by using the LZMA compression algorithm. As there is strong entropy between the ordered records in each page the LZMA algorithm is able to strip much redundancy abstracted internal to the page.

Process to Populate Catalog

Having described the optimized format of the data structures used to hold file system metadata in a catalog, we now describe with reference to the pseudocode in FIG. 19, an example of a process to populate the catalog with the file system metadata. Element numbers, in brackets, are show illustrated next to portions of the pseudocode corresponding to a process step. (Thereafter, we describe some examples of processes to use the file system metadata from the catalog.)

In the first place, at 1902, the file system metadata is collected. Such collection may be in a conventional manner, such as using utilities or other functionality provided by or with the file system itself. Also at 1902, the file system metadata is added to a temporary store (indicated in FIG. 19 as "temp store T"). In the example, the temporary store is the source of data being written into the optimized data structures of the file system metadata catalog. At 1904, the temp store T is sorted into depth-first order, if the data is not already sorted.

At 1906, the file system metadata T is processed in order. As the file system metadata T is processed, the file metadata is written directly to the catalog. In addition, the file names and directory names are written to a temporary store (indicated in FIG. 19 as "temp store FN"). Also, the directory information is written to a temporary store (indicated in FIG. 19 as "temp store D").

More specifically, at 1908, if an entry being processed from temp store T is a file entry, then the file entry is written to one or more data structures of the catalog according to the optimized format described above. Also at 1908, the file name is added to the temp store FN.

Furthermore, at 1910, if the entry being processed from temp store T is not a file entry, then the parent entry ENTRY_POINTER is found in temp store D, and the found parent (directory) entry ENTRY_POINTER is written to the catalog. In addition at 1910, the current directory+ENTRY_POINTER is written to temp store D, and the name of the found parent directory is written to temp store FN.

The 1906 processing completes when there are no more entries left in temp store T to process. At this point, all the file entries have been written into the optimized data structures of the file system metadata. What remains to be written into the catalog, however, are the file names elevating jump list and the directory buckets.

At 1912, the temp store FN is sorted, and the file names in the entries of the temp store FN are written to the catalog. At 1914, the temp store D is sorted, and the directory information in the entries of the temp store D are written to the catalog.
Process to Use the Catalog.

Now that we have described the optimized format of the data structures used to hold file system metadata in a catalog and an example of a process to populate the catalog with the file system metadata, we also describe processes to utilize the file system metadata stored in the catalog.

For example, FIG. 20 illustrates an example of pseudocode to process file system metadata stored in the catalog to display the files and children of a particular file system directory. Element numbers are illustrated in brackets to illustrate corresponding process steps. Generally, first it is desired to "open" a directory," and then view the files and children directories of the directory. From there, a child directory can be opened and its files and children viewed.

Thus, starting at the root, it is known that the root node has an ENTRY_POINTER (See FIG. 5) of 0-0. At 2002, the first file page is opened. This is at the start of the FIG. 11 "file pages" structure. The DIRECTORY BACK POINTER for the page is read (2004), as is the PARENT ENTRY POINTER for the page read (2006). In the instructions 2008, the file pages are sequenced through until a DIRECTORY BACK POINTER is reached (a byte that has its most significant bit high, as can be seen from FIG. 9) as opposed to an ATTRIBUTES (FIG. 7). After the instructions 2008, the file information is known.

The instruction 2010 is to open the first directory page (FIG. 17), and the instruction 2012 is to read the ENTRY POINTER. The child count is read (2014) and the instructions 2016 are to read the child records. After the instructions 2016, the child directories are known.

FIG. 21 illustrates an example of pseudocode to display the files and children of a child such as determined using the pseudocode of FIG. 20. At 2102, the file page identified by the page of the ENTRY POINTER is opened. At 2104, a jump is made to the offset identified by the offset of the ENTRY POINTER. At 2106, the DIRECTORY BACK POINTER is read and, at 2108, the parent ENTRY POINTER is read.

At 2110, the file information is sequenced through and read until an "attributes" byte is reached that is indicated as being a DIRECTORY BACK POINTER (FIG. 9). At 2112, the directory buckets index (FIG. 16) is binary searched to identify the directory bucket. At 2114, the directory page is opened. At 2116, instructions are for seeking the ENTRY_POINTER (i.e., to skip forward to the ENTRY POINTER). At 2118, the record for each child of the directory is read.

Another process to utilize the file system metadata stored in the catalog is an aggregation process, an example of which is now discussed with reference to FIGS. 22-27. Referring to FIG. 22, it is assumed that it is desired to starting at a particular directory and sequence through the files of the directory and all of the children of that directory, meanwhile aggregating over file system metadata for those files and/or directories. It is assumed that an ENTRY_POINTER (See FIG. 5) is provided for the directory at which to begin, obtained such as by browsing. It is therefore known where to start in the file pages for aggregation, and it is needed to determine where to finish.

As the entries are laid out depth first, the finish point will be the ENTRY_POINTER of the start ENTRY_POINTER's next sibling—or the start ENTRY_POINTER's parent's next sibling if this directory is the last at its level, and so on until a sibling is found, or the end is reached. Referring to FIG. 22, then, the following observations may be made. If file system metadata for F is being aggregated, then the finish point is I's ENTRY_POINTER. If file system metadata for C is being aggregated, then the finish point is J's ENTRY_POINTER. If the file system metadata for 1 is being aggregated, then the finish point is J's ENTRY_POINTER. If the file system metadata for J is being aggregated, then the finish point is the end.

FIG. 23 illustrates an example of pseudocode to navigate from the file page of the start ENTRY POINTER to the file page of the finish ENTRY POINTER, and to meanwhile aggregate particular file system metadata. Element numbers in brackets are included to illustrate corresponding process steps. The instruction 2302 is to open the file page of the start ENTRY POINTER. At 2304, a jump is made to the offset of the start ENTRY POINTER. At 2306, the DIRECTORY BACK POINTER is read, and at 2308 the parent is set to the parent ENTRY POINTER. Using the parent, at 2310, the finish ENTRY POINTER is found by calling the findNextSibling function (which is explained with reference to FIG. 24). The instructions 2312 are file records are sequenced through and the aggregation function is called. Finally, the instructions 2314 are to manage an end of page condition.

As just discussed, FIG. 24 illustrates an example of pseudocode to find the finish ENTRY POINTER. In particular, the findNextSibling function operates recursively to find the next sibling, or the parent's sibling if no sibling is present. The entry point 2402 takes the parent ENTRY POINTER and the start ENTRY POINTER as arguments. The instruction 2404 is to open the directory bucket for the patent ENTRY POINTER. The instructions 2406 are to sequence through the entries until the parent ENTRY POINTER is reached.

The instructions 2408 are to process entries at the directory of interest, to find and return the last sibling of the children. The instructions 2410 are to handle the case where the parent is the root node, which indicates that the last record in the catalog has been reached. Otherwise, the instructions 2412, 2414 and 2416 are to open the file page of the parent ENTRY pointer, jump to the offset of the parent ENTRY POINTER, and to read the DIRECTORY BACK POINTER. The instruction 2418 is to set the grandparent to the parent ENTRY POINTER, and then the instruction 2420 is to recursively call the findNextSibling function with the grandparent and parent, respectively, as the arguments.

FIG. 25 illustrates some exemplary query language script that may be used to generate various aggregations. It should be noted that the query language allows the easy usage of sizes (1.gb etc) and simple variable declarations.

We now describe a process to search for a particular item of information (in this case, a file name) in the catalog of file system metadata. For example, it the query may be a textual representation of the filename "foo.doc". As described above, the names of all of the files in the catalog are held in a sorted set of pages that contain the name and an ENTRY_POINTER (see FIG. 5) to where the metadata for the file lies in the file pages.

Referring to FIG. 14, these pages represent the leaves of a tree-like structure (Elevating jump list). In addition to the leaf pages, the last entry from every leaf page is held in a higher level index page. Once an index page becomes full, its last entry is then quickly propagated up to a yet higher level page with all of the pages eventually terminating at a root page.

We now turn to the pseudocode instructions illustrated in FIGS. 26 and 27. As before, element numbers are provided in brackets to illustrate corresponding process steps. Starting with FIG. 26, the instruction 2602 is to find a leafPageIndex for entries that may contain the query string. The instruction 2604 is to open the leaf page, while the instruction 2606 is to read an entry. The instructions 2608 are to sequence through the entries until the query is, if at all, reached.

The instructions 2610 to 2618 are for the situation where an entry matching the query is reached. The instructions 2612 and 2614 are to find the file information. The instructions 2616 and 2618 are to obtain the file information.

Regarding the findLeafPage function, referring to FIG. 27, at 2702, the findLeafPage function is called with query and pageIndex as arguments. The findLeafPage function finds the next leaf page containing the query, if present). As will be seen, the findLeafPage function operates recursively. The pseudocode instruction 2704 is to open the elevating jump list page indicated by pageIndex. The pseudocode instruction 2706 is to read the entry, and the pseudocode instructions 2708 are to continue to read through the entries until the query is reached or the end of the page is reached. If the end of page is reached (pseudocode instructions 2710), then the entry is not present and "−1" is returned. If the pageIndex is at the last level of intermediate pages, then the entry indexed by the pageIndcex is returned. Otherwise, the findLeafPage function is called recursively, with the entry indexed by the pageIndex as the argument.

Figure 28:
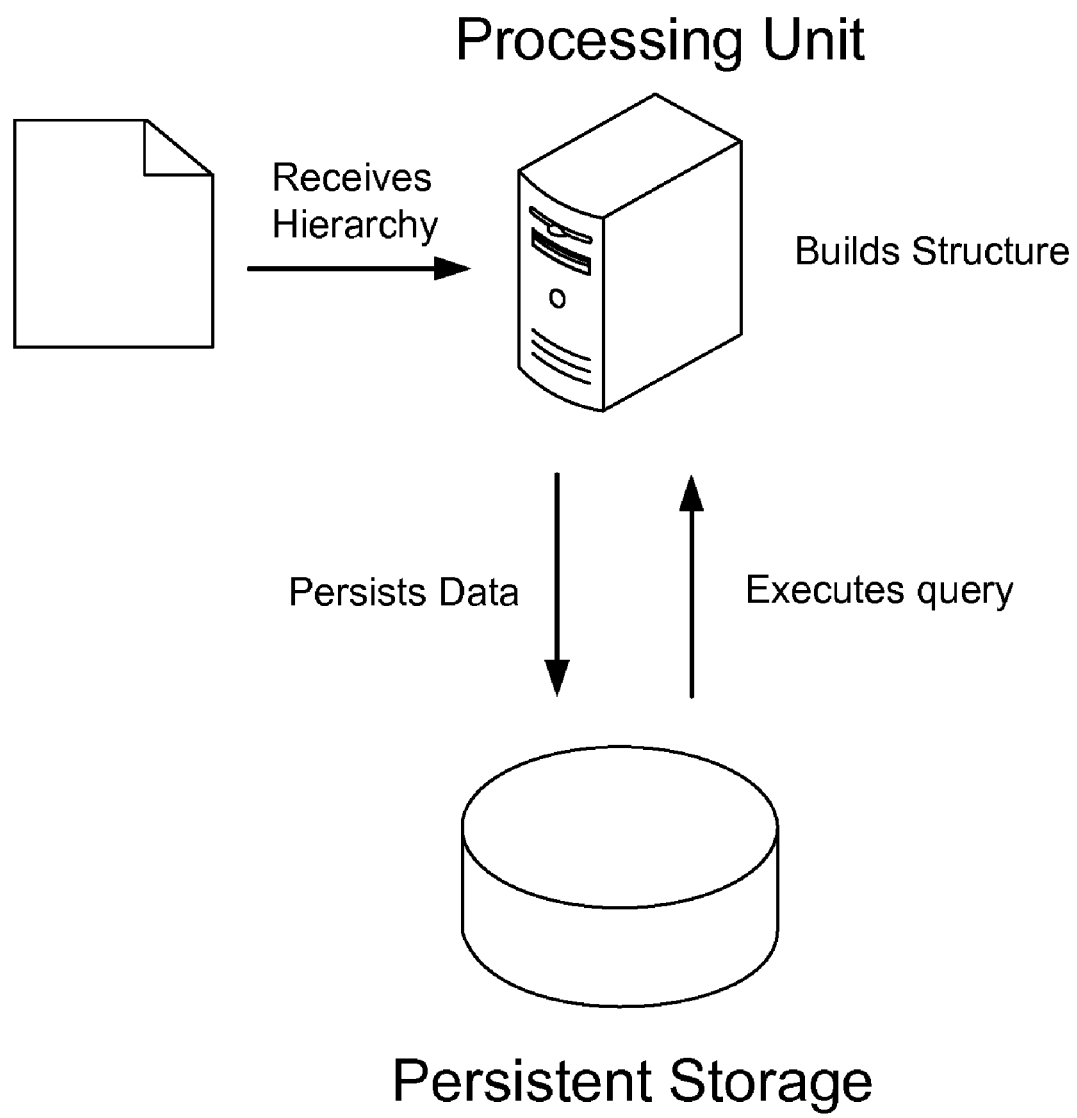
FIG. 28 illustrates aspects of an exemplary system in accordance with one embodiment of the present invention.

FIG. 28 illustrates an exemplary system for use in populating the catalog and searching for a particular item of information. A processing unit receives a hierarchy and builds the file data structures described above. A persistent storage unit is provided as a computer readable storage medium to persistently store the metadata of the catalog and to provide data for executing a query. For example, the catalog of metadata may be stored in the persistent storage unit. An exemplary persistent storage unit is a disk drive, although it will be understood that other types of persistent storage units are also contemplated. In one implementation the processor is a specially programmed processor.

In summary, the present invention is related to a system, method, and computer readable medium to store and use file system metadata in a highly optimized manner. Generally, highly optimized in this regard is referring to the organization of the stored file system metadata. A technical advantage of storing the file system metadata in the highly optimized manner is that response to queries about the file system metadata may be handled efficiently, from both an I/O and processing point of view. Furthermore, the amount of space taken up by the potentially large amount of file system metadata may be optimized.

Experiments by the inventor on real world test data have achieved compression levels of 8 bytes per file to store the name, extension, size, create data, modify the date, attributes, and directory. Moreover, this remarkable compression level is achieved in a layout of data that facilitates extremely fast reads and aggregations. The data structure allows for sequential, single pass aggregation yielding performance results an order of magnitude better than commercial databases when performing aggregations such as counts, data banding, and largest file lookups.

We have thus shown and described a system, method, and computer readable medium in which file system metadata is stored in a catalog that is highly optimized, such that the technical effect is that processes to use the file system metadata from the catalog can operate in a highly efficient manner. We have also described examples of such processes to create the catalog as well as to process file system metadata from the catalog.

Embodiments of the present invention may be employed to facilitate creating and using a file system metadata catalog in any of a wide variety of computing contexts. For example, implementations are contemplated in which users may interact with a diverse network environment via any type of computer (e.g., desktop, laptop, tablet, etc), media computing platforms (e.g., cable and satellite set top boxes and digital video recorders), handheld computing devices (e.g., PDAs), cell phones, or any other type of computing or communication platform.

According to various embodiments, applications may be executed locally, remotely or a combination of both. The remote aspect may be embodied, for example, by a server and data store which, as will be understood, may correspond to multiple distributed devices and data stores.

The various aspects of the invention may also be practiced in a wide variety of network environments including, for example, TCP/IP-based networks, telecommunications networks, wireless networks, etc. In addition, the computer program instructions with which embodiments of the invention may be implemented (e.g., as a result of being executed by a processor of a computing device, the computing device also including a memory and/or other tangible storage from which the computer instructions may be executed may be stored in any type of computer-readable media, and may be executed according to a variety of computing models including, for example, on a stand-alone computing device, or according to a distributed computing model in which various of the functionalities described herein may be effected or employed at different locations.

Thus, for example, an optimized method may be provided to store file system metadata in a catalog. The method may comprise storing the captured file system metadata in the catalog on at least one tangible computer readable medium, wherein the catalog of file system metadata is tangibly embodied in the at least one tangible computer readable medium organized in records such that file system metadata records are stored in a logical sequence that is in a depth first manner, so that an access operation of a full scan of a directory and children of the directory progresses sequentially through the records and pages of records. Such organization may be, more broadly, in a manner that accounts for affinities between the metadata and logical use cases for accessing the file system metadata.

For example, the catalog of file system metadata being organized in records may include the records being packed into catalog pages, wherein each catalog page includes a plurality of file pages, each file page including metadata regarding a separate file.

The file pages may be compressed, each file page being self-contained such that the file pages can be decompressed without reference to any other self-contained file page, the uncompressed size of each file page being matched to page sizes of a file system on which the catalog is stored.

The file pages may be organized with respect to directories of the file system such that, for each directory, there is a directory back pointer, a parent entry pointer, and a plurality of file page records for files contained within that directory.

Each catalog page may further include a page pointer array, wherein the page pointer array is an array of pointers to the file pages in that catalog page.

In addition, a directory elevating jump list and/or file page elevating jump list may be provided.

Although only a few embodiments of the invention have been described in detail, it should be appreciated that the invention may be implemented in many other forms without departing from the spirit or scope of the invention. Therefore, the present embodiments are to be considered as illustrative and not restrictive and the invention is not to be limited to the details given herein, but may be modified within the scope and equivalents of the appended claims.

What is claimed is:

1. An optimized method to store, in a catalog, file system metadata representing data characterizing a plurality of items organized in a hierarchical structure, the method comprising:

storing the file system metadata in the catalog on at least one tangible computer readable medium, wherein the catalog of file system metadata is tangibly embodied in the at least one tangible computer readable medium organized in records such that file system metadata records are stored in a logical sequence in a depth first order within a hierarchical structure, so that an access operation of a full scan of a node of the hierarchical structure and children of that node progresses sequentially through the records and pages of records.

2. The method of claim 1, wherein:
the catalog of metadata being organized in records includes the records being packed into catalog pages, wherein each catalog page includes a plurality of item pages compressed in a sequential order such that the item pages are decompressible without reference to any other item page, each catalog page including a directory of metadata regarding the plurality of items.

3. The method of claim 2, wherein:
the item pages are organized with respect to directories of the items such that, for each directory, there is a directory back pointer, a parent entry pointer, and a plurality of item page records for items contained within that directory.

4. The method of claim 2, wherein:
each catalog page further includes a page pointer array, wherein the page pointer array is an array of pointers to the item pages in that catalog page.

5. The method of claim 1, wherein the catalog of metadata is organized into catalog pages in which each catalog page is logically organized into a header, a sequential set of compressed item pages storing details of files in which each individual compressed item panes is independently decompressible without reference to any other compressed item pane, a compressed file name elevating jump list, compressed directory buckets including child pointers and parent pointers, and a page pointer array to offsets in the item pages in that catalog page.

6. The method of claim 1, wherein:
storing the file system metadata in the catalog on at least one tangible computer readable medium includes storing at least one item names elevating jump list structure tangibly embodied in the at least one tangible computer readable medium, the at least one items names elevating jump list structure organizing a list of item names that groups ordered names next to each other for sequential traversal, wherein the item name records of the item names elevating jump list point to a corresponding item record in the catalog pages.

7. The method of claim 1, wherein:
storing the file system meta data in the catalog on the at least one tangible computer readable medium includes storing at least one directory buckets structure tangibly embodied in the at least one tangible computer readable medium, further including storing an ordered array of indexes that identifies the first page number in each bucket, wherein each directory bucket includes a sequence of item entry pointers such that the sequence corresponds to the logical sequence of the item records in the catalog, each item entry pointer pointing to a file page in the catalog including the metadata for the items of a particular directory.

8. The method of claim 1, wherein storing the file system metadata in the catalog on at least one tangible computer readable medium further comprises:
storing a elevating jump list grouping organizing a list of item names that groups ordered names next to each other for sequential traversal; and storing a directory that names records for all child directories grouped together under the name record of the parent.

9. A computer-implemented method of processing a catalog of file system metadata representing data characterizing a plurality of items in a hierarchical structure organized in a logical sequence which is in a depth first manner so that an access operation of a full scan of a node of the hierarchical structure and children of that node progresses sequentially, the method comprising:
determining a start point and stop point in the catalog of file system metadata based on a desired processing; and
sequentially encountering the catalog of metadata from the start point to the stop point;
while sequentially encountering the catalog of metadata, processing the encountered file system metadata in accordance with the desired processing.

10. The computer implemented method of claim 9, wherein the hierarchical structure includes a elevating jump list structure organizing a list of item names that groups ordered names next to each other for sequential traversal, the method further comprising:
sequentially accessing name items of at least one items names elevating jump list structure, the at least one items names elevating jump list structure organizing a list of item names that groups ordered names next to each other for sequential traversal, wherein the item name records of the item names elevating jump list point to a corresponding item record in the catalog pages; and
accessing the catalog of metadata based on pointers in the items names records of the items names elevating jump list structure.

11. The computer implemented method of claim 9 wherein a directory names records for all child directories grouped together under the name record of the parent, the method further comprising:
said sequentially encountering the catalog of metadata including locating a parent and checking the directory names records to identify children of the parent.

12. A computer-implemented method of processing a catalog of file system metadata representing data characterizing a plurality of items organized in a hierarchical structure, comprising:
sequentially accessing name items of at least one items names elevating jump list structure, the at least one items names elevating jump list structure organizing a list of item names that groups ordered names next to each other for sequential traversal, wherein the item name records of the item names elevating jump list point to a corresponding item record in the catalog pages organized in a depth first order; and
accessing the catalog of file system metadata based on pointers in the items names records of the items names elevating jump list structure.

13. The computer-implemented method of claim 12, wherein:
accessing the catalog of file system metadata includes accessing, in the catalog, entries for a directory of items including a particular item whose item name record has been accessed in the items names elevating jump list.

14. A computer-readable media product comprising at least one computer readable medium having a catalog of file system metadata tangibly embodied thereon, the file system metadata representing data that characterizes a plurality of items organized in a hierarchical structure, wherein the catalog of file system metadata is tangibly embodied in the at least one tangible computer readable medium organized in records such that file system metadata records are stored in a logical sequence that is in a depth first order of a hierarchical structure, so that an access operation of a full scan of a node of the hierarchical structure and children of that node progresses sequentially through the records and pages of records.

15. The computer-readable media product of claim 14, wherein:
the catalog of metadata being organized in records includes the records being packed into catalog pages, wherein each catalog page includes a plurality of item pages compressed in a sequential order such that the item pages are decompressible without reference to any other item page, each catalog page including a directory of metadata regarding the plurality of items.

16. The computer-readable media product of claim 15, wherein:
the item pages are organized with respect to directories of the items such that, for each directory, there is a directory back pointer, a parent entry pointer, and a plurality of item page records for items contained within that directory.

17. The computer-readable media product of claim 15, wherein:
each catalog page further includes a page pointer array, wherein the page pointer array is an array of pointers to the item pages in that catalog page.

18. The computer-readable media product of claim 15, wherein the catalog of metadata is organized into catalog pages in which each catalog page is logically organized into a header, a sequential set of compressed item pages storing details of files in which each individual compressed item pages is independently decompressible without reference to any other compressed item page, a compressed file name elevating jump list, compressed directory buckets including child pointers and parent pointers, and a page pointer array to offsets in the item pages in that catalog page.

19. The computer-readable media product of claim 14, wherein:
the file system metadata in the catalog includes at least one item names elevating jump list structure organizing a list of item names that groups ordered names next to each other for sequential traversal, wherein the item name records of the item names elevating jump list point to a corresponding item record in the catalog pages.

20. The computer-readable media product of claim 14, wherein:
the file system meta data in the catalog includes an ordered array of indexes that identifies the first page number in each bucket, wherein each directory bucket includes a sequence of item entry pointers such that the sequence corresponds to the logical sequence of the item records in the catalog, each item entry pointer pointing to a file page in the catalog including the file system metadata for the items of a particular directory.

21. The computer-readable media product of claim 14, wherein the catalog further comprises:
a elevating jump list grouping organizing a list of item names that groups ordered names next to each other for sequential traversal; and
a directory that names records for all child directories grouped together under the name record of the parent.

22. The computer-readable media product of claim 14, wherein:
at least some of the item pages include a pointer to an entry in a separate catalog, wherein the entries in the separate catalog are entries including metadata for the item that has not changed as information for the item of the item page is being evaluated for storage into the catalog.

\* \* \* \* \*